United States Patent [19]

Morinigo

[11] Patent Number: 5,734,217
[45] Date of Patent: Mar. 31, 1998

[54] INDUCTION MACHINE USING FERROMAGNETIC CONDUCTING MATERIAL IN ROTOR

[75] Inventor: Fernando B. Morinigo, Los Angeles, Calif.

[73] Assignee: Aura Systems, Inc., El Segundo, Calif.

[21] Appl. No.: 705,255

[22] Filed: Aug. 29, 1996

Related U.S. Application Data

[63] Continuation-in-part of Ser. No. 606,451, Feb. 23, 1996, which is a continuation-in-part of Ser. No. 444,382, May 18, 1995.

[51] Int. Cl.$^6$ ........................................... H02K 17/00
[52] U.S. Cl. .......................... 310/166; 310/201; 310/268
[58] Field of Search .................................. 310/166, 168, 310/268, 201, 211

[56] References Cited

U.S. PATENT DOCUMENTS

| | | | |
|---|---|---|---|
| 3,225,235 | 12/1965 | Lee | 310/268 |
| 4,007,387 | 2/1977 | Rustecki | 310/42 |
| 4,081,726 | 3/1978 | Brimer | 318/207.4 |
| 4,095,150 | 6/1978 | Senckel | 310/166 X |
| 4,155,018 | 5/1979 | Oudet | 310/49 |
| 4,501,986 | 2/1985 | Gheorghe | 310/201 X |
| 4,517,478 | 5/1985 | Oudet | 310/49 |
| 4,658,166 | 4/1987 | Oudet | 310/156 |
| 4,682,067 | 7/1987 | Oudet | 310/156 |
| 5,053,667 | 10/1991 | Oudet | 310/268 |
| 5,097,167 | 3/1992 | Kanayama et al. | 310/201 |
| 5,396,140 | 3/1995 | Goldie | 310/268 |

Primary Examiner—Mark O. Budd
Attorney, Agent, or Firm—Anthony T. Cascio; Kathy Mojibi

[57] ABSTRACT

An induction machine having ferromagnetic conducting material in the rotor is disclosed. The machine may be used as a motor, an alternator, a generator, or an alternator/starter. The machine includes a first stator and a second stator in a symmetrical mirrored relationship to the first stator such that a gap is defined intermediate the first and second stator. A disk-shaped rotor is disposed in the gap. The rotor is substantially comprised of ferromagnetic material electrically conducting in the radial direction and may include copper bars or rings embedded within the rotor.

10 Claims, 6 Drawing Sheets

INDUCTION MACHINE USING FERROMAGNETIC CONDUCTING MATERIAL IN ROTOR

RELATED APPLICATION DATA

The present application is a continuation-in-part of commonly owned, co-pending application U.S. Ser. No. 08/606,451, filed on Feb. 23, 1996 for Ferrodisk Motor, which is a continuation-in-part of commonly owned, co-pending application U.S. Ser. No. 08/444,382, filed on May 18, 1995 for Polyphase Induction Motor Having A Ferromagnetic Rotor Plate, both of which are incorporated by reference herein.

FIELD OF THE INVENTION

The present invention relates generally to motors, and more particularly to polyphase induction motors and induction generators.

BACKGROUND OF THE INVENTION

Induction A.C. electrical motors are widely used in commercial, industrial, domestic and other applications where rotational power is required. A typical type of an A.C. induction motor is the type known commonly as a squirrel cage motor. In such a motor the rotor current flows along a set of bars connected to rings which, if viewed alone, resembles a squirrel cage. One drawback of the squirrel cage motor for some applications, however, is the large rotational inertia of the rotor.

Another known type of induction motor is the shaded pole motor. The rotor of the shaded pole motor is generally a thin disk of aluminum. Therefore, the rotor of the shaded pole motor has relatively small rotational inertia. In these motors the rotor currents flow everywhere in the bulk rotor material. A problem with the shaded pole motor however is that the torques produced are insufficient for many applications. The shaded pole motor is therefore not suitable as a practical high efficiency motor.

The challenge of induction machine design is to achieve the maximum torque in the smallest possible space with heat generation low enough to permit continuous operation. Since the magnetic field produced by the stator in the squirrel cage design will flow almost exclusively through the iron component of the rotor, the magnetic flux must flow around the squirrel cage bars prior to returning back through the stator. The presence of the conducting bars unavoidably limits, or chokes, the flux in the rotor. In the standard design, the bars required to provide sufficient conductivity are large enough to choke the flux, and limit the potential torque.

In the past, induction motors were designed having two facing stators and a disk-shaped rotor in the gap between the stators. For example, in Brimer, U.S. Pat. No. 4,081,726, an induction machine of such a type is disclosed. However, the rotor in Brimer and other similar motors was typically fabricated from a material such as copper or aluminum so that rotor currents would flow in a low resistivity material. Ferromagnetic material such as iron or steel was not considered desirable because the resistivity of iron is at least six times greater than that of copper. By way of example, in Brimer, the use of a rotor free of ferromagnetic material is specifically taught. A problem with the use of copper or aluminum material for the rotor disk however, was the resulting lack of structural rigidity in the rotor.

Other induction motors having disk shaped rotors were also designed wherein small portions of the rotor were fabricated from ferromagnetic material. In these designs, the ferromagnetic material was inserted into the rotor in an attempt to enhance the flux carrying capacity of the rotor. For example, Senckel, U.S. Pat. No. 4,095,150 discloses a two phase asynchronous motor having a rotor with ferromagnetic bridges disposed between two offset facing stator portions. In Senckel, however, the ferromagnetic bridges are specifically laminated to prevent current from traveling through the ferromagnetic bridges and instead causing current to flow around the bridges. As another example, in Lee, U.S. Pat. No. 3,225,235, a dynamo-electric machine is disclosed having a rotor disk fabricated primarily from copper or aluminum and having axially oriented iron strands in the rotor. The axially oriented iron strands, however, do not promote the electrical conductivity of the rotor. Therefore, in both Senckel and Lee, the ferromagnetic material portions, although designed to enhance the flux carrying capacity of the the rotor, do not increase the current carrying capacity of the rotor. Moreover, in both Senckel and Lee a problem exists in that the ferromagnetic inserts are attracted to the stators with very large forces, and the copper and aluminum disks are not sufficiently rigid to maintain the small air gaps.

In view of these known induction motor designs, it has been discovered that, in an induction machine having symmetrical mirrored facing stators with a disk-shaped rotor, the force or torque produced is proportional to the radial conductance times the flux squared. In order to take advantage of this relationship, a need exists for an induction machine utilizing a disk-shaped rotor that is substantially fabricated from ferromagnetic material disposed intermediate two mirrored facing stators.

Therefore, a need exists for an induction machine that enhances the flux carrying capacity of the rotor to achieve higher torques for smaller overall machine size. A need also exists for an induction machine that preserves or enhances the electrical conductivity of the rotor to achieve high efficiency. A need further exists for an induction machine that simultaneously reduces the rotational inertia of the rotor for a given torque.

SUMMARY OF THE INVENTION

Accordingly, it is a primary object of the present invention to overcome one or more disadvantages and limitations of the prior art.

A significant object of the present invention is to provide an induction machine that enhances both the flux carrying capacity of the rotor and the electrical conductance of the rotor in order to achieve both high torques and efficiency.

Another object of the present invention is that the induction machine can also be used as a motor, generator, alternator or starter by simply changing the electrical system controls.

According to a broad aspect of the invention, an induction machine having ferromagnetic conducting material in the rotor is disclosed. The machine may be used as a motor, an alternator, a generator, or a starter. The machine includes a first stator and a second stator in a symmetrical mirrored relationship to the first stator such that a gap is defined intermediate the first and second stator. A disk-shaped rotor is disposed in the gap. The rotor is substantially comprised of ferromagnetic material electrically conducting in the radial direction and may include copper bars or rings embedded within the rotor in order to improve energy efficiency.

A feature of the present invention is the use of rotor material simultaneously for the conduction of electric current and magnetic flux. A brushless induction motor has a maximum torque roughly proportional to the product of the square of the magnetic flux and to the electrical conductance of the rotor in a direction perpendicular to the flux and parallel to the axis of rotation. In the present invention, the conductor material in the rotor is largely ferromagnetic, in a proportion such that, without changing the conductance, the ability of the rotor to carry magnetic flux is substantially enhanced. This means the design has improved efficiency in torque per mass, or torque per input power, or both.

Another feature of the present invention is the use of ferromagnetic material in the rotor that provides both structural integrity for the rotor and maximizes the rotor currents.

Another feature of the present invention is the use of a rotor in the shape of a thin disk wherein the thickness of the disk is substantially smaller than the radius of the disk. By this feature the rotational inertia of the rotor is reduced, as compared to a standard squirrel cage motor.

Another feature of the present invention is the symmetric placement of electromagnets around the current carrying volume of the rotor. This feature enhances the flux through the rotor plate without decreasing conductance.

Another feature of the present invention is the matching of the flux carrying capacity of the stators and the rotor. When the geometric proportions are matched and optimized, the result is a rotor that can carry substantially more magnetic flux in a comparable circumferential distance.

Yet another feature of the present invention is the strips or bars, made of higher conductivity material, embedded in the rotor in order to enhance the electrical conductance of the rotor.

These and other objects, advantages and features of the present invention will become readily apparent to those skilled in the art from a study of the following description of an exemplary preferred embodiment when read in conjunction with the attached drawings and appended claims.

DESCRIPTION OF AN EXEMPLARY PREFERRED EMBODIMENT

Figure 1:
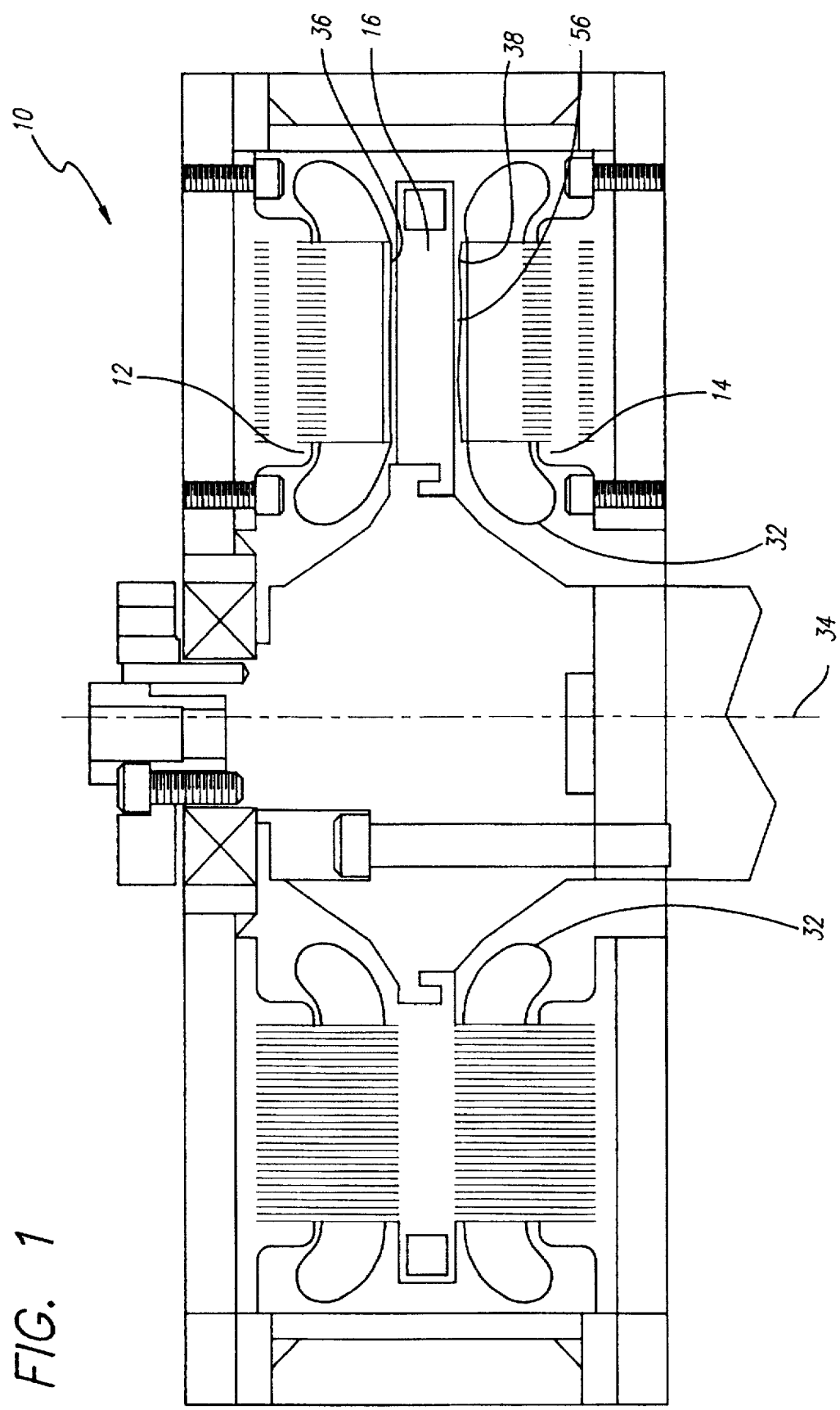
FIG. 1 is a side partial cross-sectional view of one embodiment of the motor of the present invention.

Referring now to FIGS. 1, 4, 5 and 6, an induction machine 10 is shown. The machine includes an upper stator or electromagnet arrangement 12, a lower stator or electromagnet arrangement 14, and a conductor rotor or plate 16 substantially fabricated from ferromagnetic material. The upper stator 18 and the lower stator stator 20 are in a mirrored symmetrical facing relationship to each other. The rotor 16 rotates about an axis of rotation 34.

The stators 12,14 include coil windings 32 that are formed to best fit into the available space provided by the machine. The coils 32 used in the stators of the machine will vary according to the desired application of the machine. The first electromagnet arrangement 12 and the second electromagnet arrangement 14 are positioned such that the pole faces 52 of the first electromagnet arrangement 12 are in a mirrored facing relationship with the pole faces 54 of the second electromagnet arrangement 14, defining a gap 56 therebetween. The first and second electromagnet arrangements are of the same shape and dimension and are mirror images of each other.

The ferromagnetic conductor rotor 16 is disposed in the gap 56 between the pole faces 52,54 of the first and second electromagnetic arrangements and rotates about the axis of rotation 34. The conductor rotor 16 is preferably disk shaped. An upper magnetic air gap 36 is defined between the upper stator 18 and the rotor 16. A lower magnetic air gap 38 is defined between the lower stator 20 and the rotor 16.

The symmetric mirrored placement of the upper and lower stators 12,14 around the current carrying volume of the rotor 16 causes the magnetic flux in the current carrying volume of the rotor to be maintained perpendicular to the currents and parallel to the axis of rotation 34. The positioning of the stators on both sides of the rotor plate enhances the flux through the rotor plate because less stator length is required for copper wire. In other words, the magnetic flux through the rotor increases without decreasing the electrical conductivity through the rotor. This feature largely bypasses a weakness of the squirrel cage design referred to as the "skin effect."

A feature of the induction machine is the matching of the flux carrying capacity of the stators and the rotor. When the geometric proportions are matched and optimized, the result is a rotor that can carry substantially more magnetic flux in a comparable circumferential distance. More specifically, the cross section of the magnetic circuit of the machine, defined by the area of ferromagnetic material measured on surfaces perpendicular to the magnetic flux lines, is kept as nearly constant as possible throughout the circuit.

Figure 2:
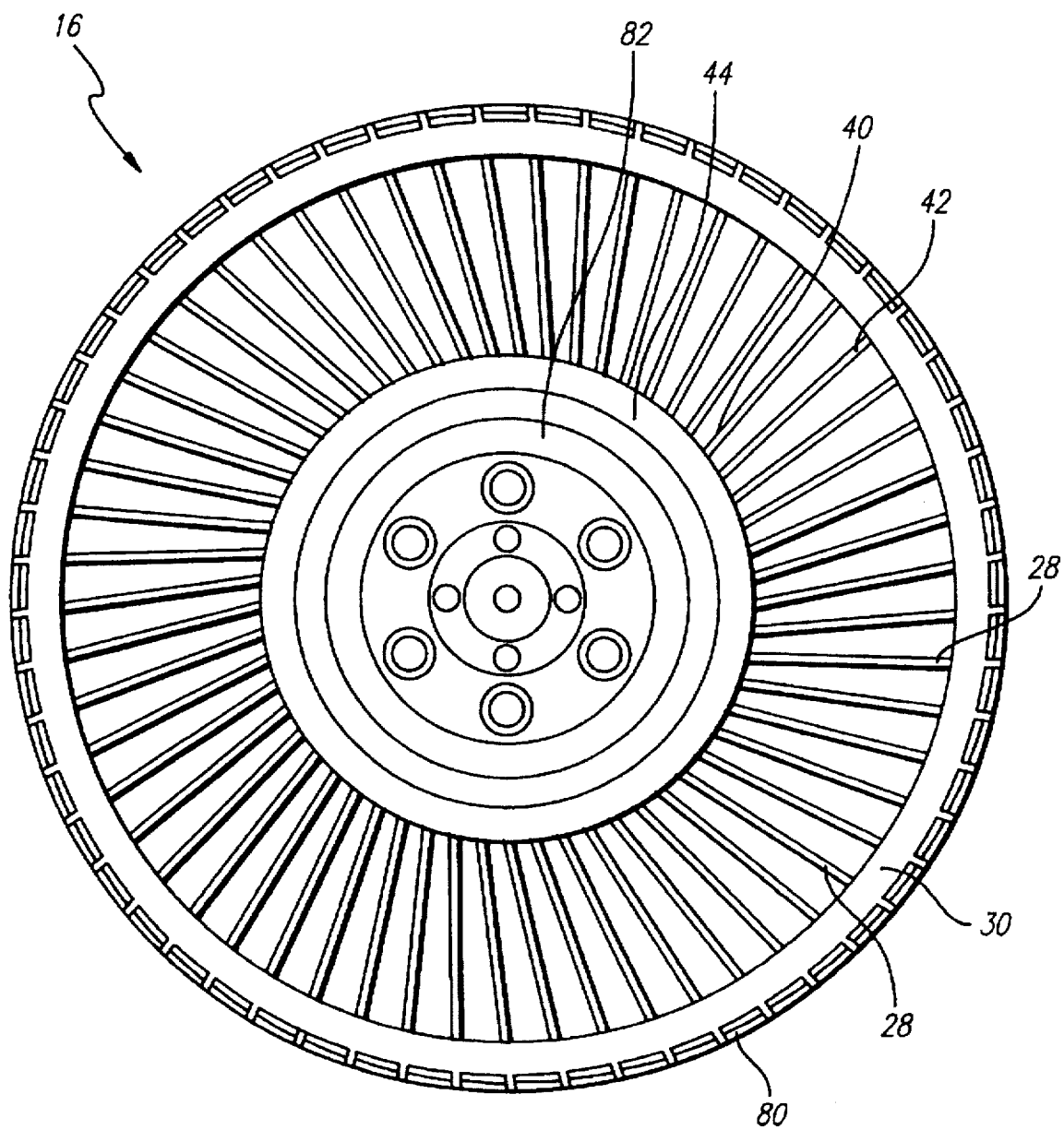
FIG. 2 is a top view of a rotor of an embodiment of the motor of the present invention.
Figure 3:
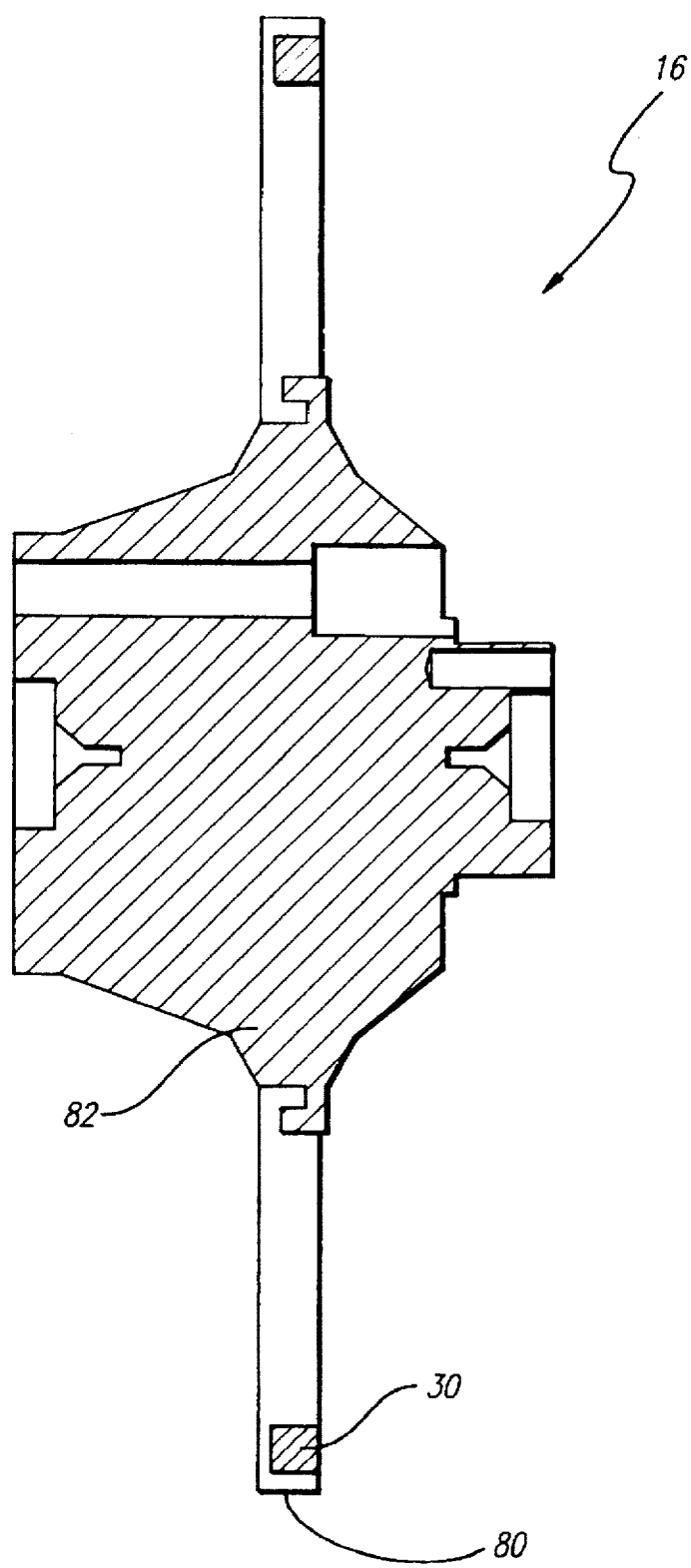
FIG. 3 is a side view of a rotor of an embodiment of the motor of the present invention.
Figure 4:
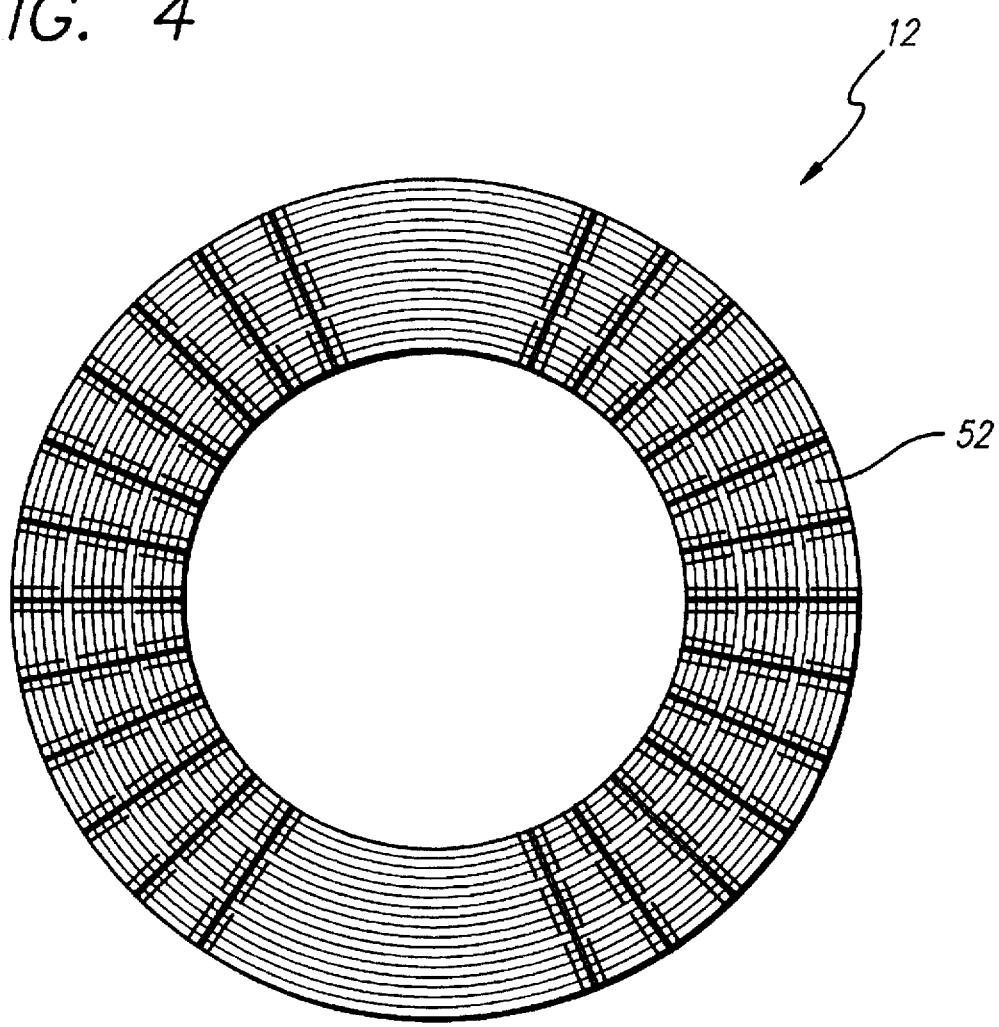
FIG. 4 is a top view of a laminations block of an upper stator of an embodiment of the motor of the present invention.
Figure 5:
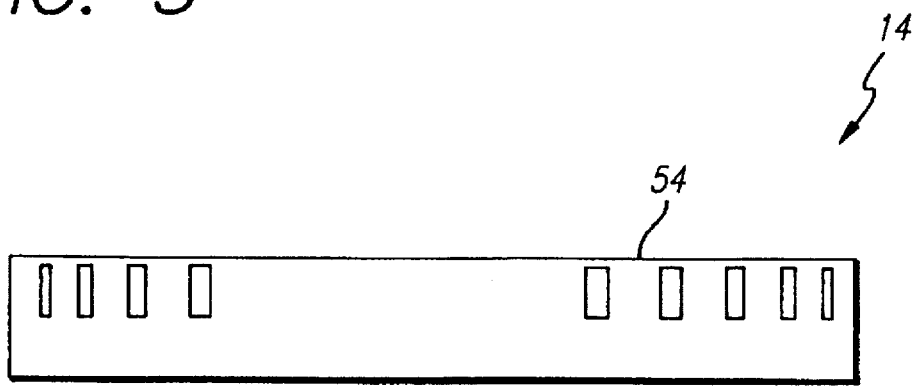
FIG. 5 is a side view of a lower stator of an embodiment of the motor of the present invention.
Figure 6:
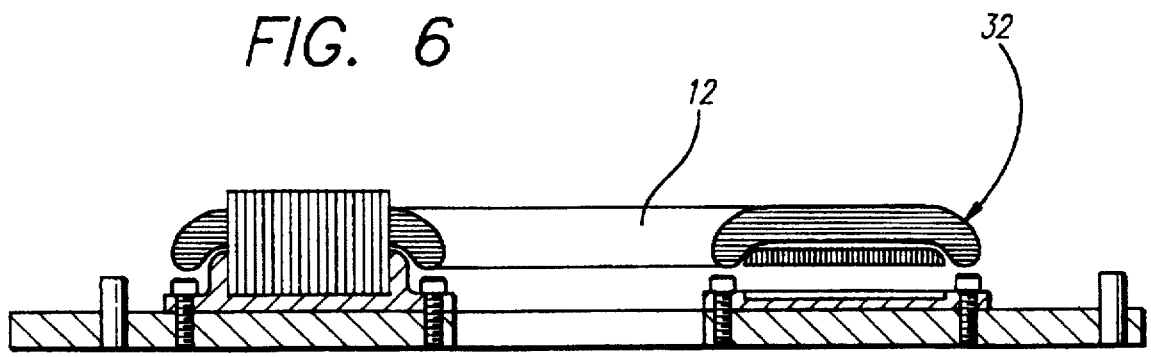
FIG. 6 is a partial cross-sectional side view of a stator of an embodiment of the motor of the present invention.

FIGS. 2 and 3 show the rotor 16 of the machine. The bulk of the rotor disk is preferably fabricated from a solid, low carbon steel or pure iron. As previously described, the design of the present invention is optimized for minimum overall weight and matching the flux carrying capacity of the stator and the rotor. Therefore, an improved design with reduced rotor resistance is achieved by enhancing the electrical conductance of the rotor by embedding a plurality of conduction strips or bars 28 in the rotor.

As shown in FIG. 2, the conduction bars 28 each define an inner end 40 and an outer end 42. The conduction bars 28 are preferably equally spaced radially around the rotor disk 16. The conduction bars are also preferably embedded in a skewed manner such that each bar 28 extends radially outward from its inner end 40 at an angle to the radius of the rotor passing through that end. The angle of skew is preferably a few degrees, with the angle of skew being the same for all the bars. For other applications, however, the bars may extend wholly radially.

The rotor 16 further includes an outer conduction ring 30 aligned with an outer circumference 80 of the rotor. The machine 10 also includes an inner conduction ring 44 surrounding a center portion 82 of the rotor. Alternatively, a motor hub may be used as the inner conduction ring. The inner and outer conduction rings 30,44 are preferably fabricated from copper or aluminum. The outer end 42 of each of the conduction bars is electrically connected to the outer conduction ring 30. The inner end 40 of each of the conduction bars is electrically connected to the inner conduction ring 44 or the motor hub.

The conduction bars 28 are preferably fabricated from a high conductivity material such as copper or aluminum. The optimum proportion of copper or aluminum to the steel or iron material of the rotor depends on the stator characteristics as well as the precise electrical characteristics of the steel or iron of the rotor. In the preferred embodiment, the proportion of steel or iron to the copper or aluminum is approximately five to twenty percent. Therefore, the conductor material in the rotor is substantially or primarily ferromagnetic, in a proportion such that, without changing the rotor conductance, the ability of the rotor to carry magnetic flux is substantially enhanced. This means the design has improved efficiency in torque per mass, or torque per input power, or both.

By way of example, the flux carrying capacity of the rotor is optimized when the proportion of copper and iron in the rotor maximizes the product of the conductance in the radial direction times the square of the permeability in the axial direction. For pure copper and low carbon steel, the proportion of copper is twenty per cent and the proportion of iron is eighty per cent. These proportions are a consequence of the fact that the ratio of the resistivity of copper ($1.75 \times 10^{-6}$ ohm -m) to the steel ($10.5 \times 10^{-6}$ ohm -m) is ⅙. For higher resistivity steel of higher carbon content, the proportion of copper is higher.

Because the steel or iron in the rotor aids in the conduction of electrical current in the rotor, a substantially smaller volume of aluminum or copper is required to achieve the same efficiency as achieved in a standard induction motor. This results in higher magnetic flux densities in the air gaps 36, 38 and therefore achieves higher motor torque.

In fabrication of the rotor, care must be taken to guarantee electrical continuity between the copper material of the conductor bars or rings and the iron material of the rotor. The electrical conductance may be accomplished either by using a brazing technique or a special casting process. Alternatively, pieces having metallurgically clean faces may be pressed without any airgaps remaining in the metal boundaries.

As previously described, another feature of the present invention is the matching of the flux carrying capacity of the stators 18, 20 and the rotor 16. The magnetic flux that determines the torque of the machine encircles rotor currents and stator currents, which flow in the stator windings. The use of two stators rather than one as in a standard squirrel cage induction machine means that a given number of stator ampere turns, at a given current density, uses up less circumferential length, because the ampere turns are split into two regions rather than being placed all on one side of the rotor currents. When the geometric proportions are matched and optimized, the result is a rotor that can carry substantially more magnetic flux in a comparable circumferential distance.

Figure 7:
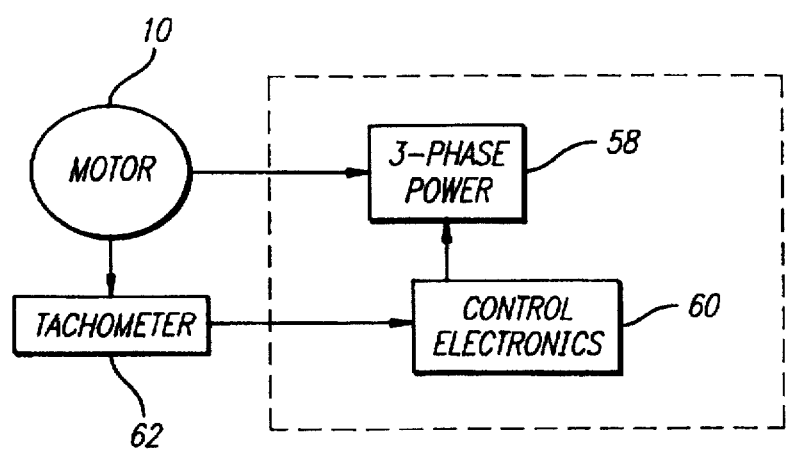
FIG. 7 is a system block diagram of the induction machine used as a motor.
Figure 8:
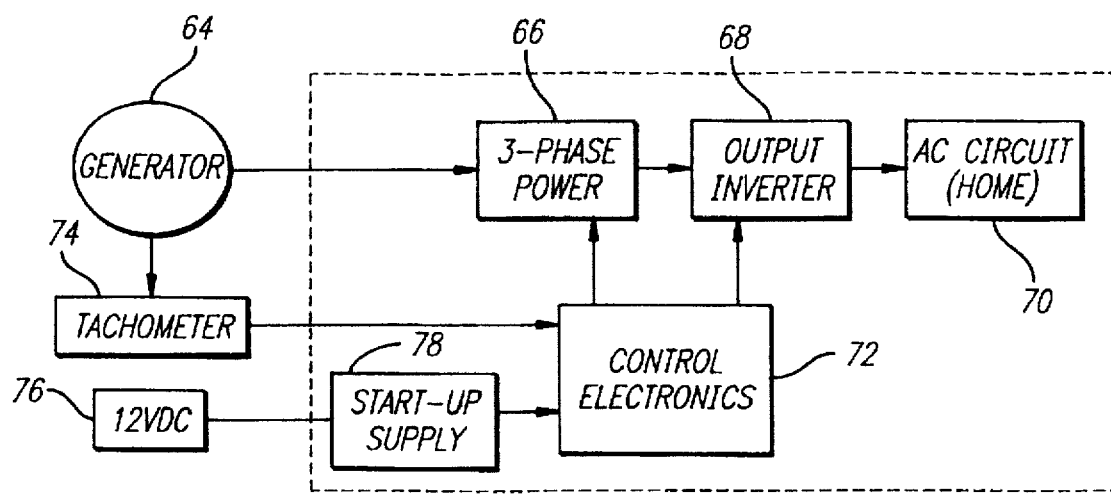
FIG. 8 is a system block diagram of the induction machine used as a generator.

Referring now to FIG. 7, a system block diagram is shown for the induction machine of the present invention used as a motor. The system includes the motor 10, three phase power 58, control electronics 60, and a tachometer 62. Referring now to FIG. 13, a system block diagram is shown for the induction machine of the present invention used as a generator 64. The system includes a the generator 64, three phase power 66, an output inverter 68, an AC circuit 70, control electronics 72, and a tachometer 74. When the induction machine is used with on motor vehicles, the system further includes a DC power source 76, and a start up supply 78. It should be noted that the three phase power 66 may be replaced with quadriphase power. Moreover, other polyphase options could be made to work for special applications.

It is therefore to be understood that the induction machine of the present invention may be used as a motor, a generator, an alternator, or a starter. The use of the motor as a generator, alternator, or starter requires only the modification of the electrical control system such that the power generated or recovered is channeled to a battery or power grid. The induction machine may also be used as a starter/alternator by connecting the rotor portion of the machine to the flywheel of the engine.

Figure 9:
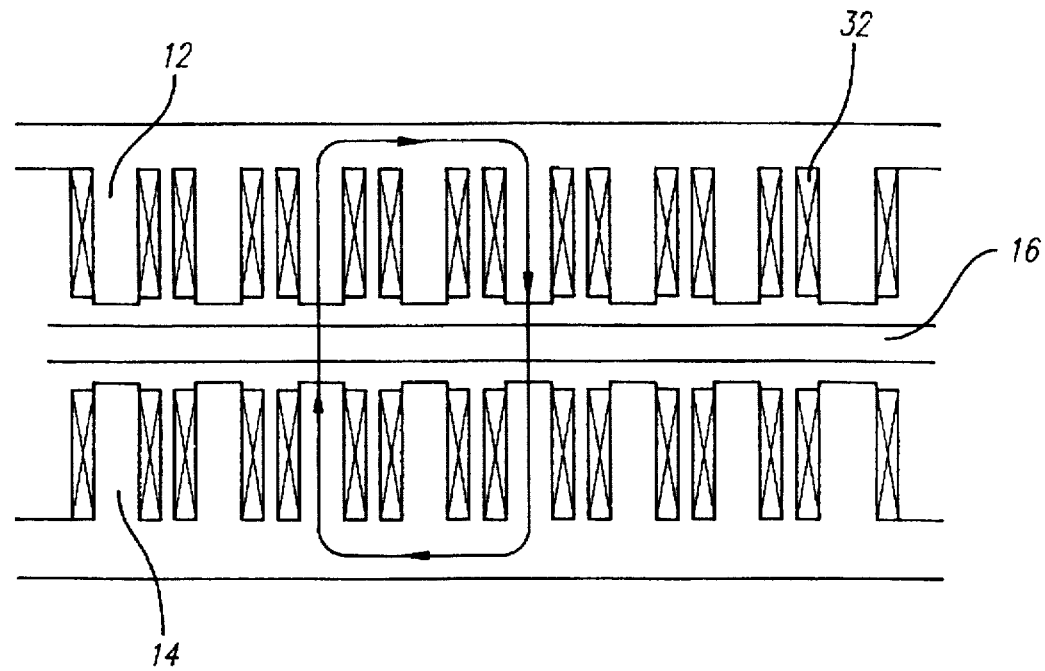
FIG. 9 is a side view of of the induction machine of the present invention used as a linear actuator.

Referring now to FIG. 9, it is to be understood that, with appropriate electronic controls, and by converting the circumferential lengths of the stators and rotor into straightline lengths, the induction machine can be linear or rotary and can be made reversible to function as an actuator.

There has been described hereinabove an exemplary preferred embodiment of an induction machine according to the principles of the present invention. Those skilled in the art may now make numerous uses of, and departures from, the above-described embodiments without departing from the inventive concepts disclosed herein. Accordingly, the present invention is to be defined solely by the scope of the following claims.

I claim as my invention:

1. An induction machine comprising: p1 a first stator, said first stator having electrical current conductive coil windings disposed therein to form a plurality of angularly spaced radially disposed pole faces;

a second stator, said second stator having electrical current conductive coil windings disposed therein to form a plurality of angularly spaced radially disposed pole faces in a facing symmetrical mirrored relationship to said pole faces of said first stator such that a gap is defined intermediate said first and second stator, wherein a current induced in said windings in said first stator and said second stator will develop axially directed magnetic flux across said gap between each of said pole faces on said first stator and each facing one of said pole faces on said second stator;

a disk-shaped rotor disposed in said gap, said rotor having an electrically conductive ferromagnetic structural portion, a plurality of angularly spaced radially disposed electrically conductive ferromagnetic regions and a plurality of electrically conductive nonferromagnetic conductor bars disposed interstitially said ferromagnetic regions wherein electrical conductivity is continous between said conductor bars and said regions such that magnetic flux when present in said gap permeates axially through said rotor through said regions to develop radially directed electrical currents through said conductor bars and said regions.

2. An induction machine in accordance with claim 1 wherein said conductor bars are embedded at a skewed angle from the center portion of the rotor.

3. An induction machine as set forth in claim 1 wherein said rotor further includes:

a first region of electrically conductive non-ferromagnetic material disposed in an angular direction in the face of said rotor to connect the radially outward ends of each of said conductor bars to each other; and a second region of electrically conductive non-ferromagnetic material disposed in an angular direction in the face of said rotor to connect the radially inward ends of said conductor bars to each other.

4. An induction machine in accordance with claim 3 wherein said conductive material is comprised of aluminum.

5. An induction machine in accordance with claim 1 wherein said rotor has a thickness and a radius, said thickness being much smaller than said radius.

6. An induction machine in accordance with claim 3 wherein said conductive material is comprised of copper.

7. An induction machine comprising:

a first electromagnet arrangement, said arrangement having electrical current conductive coil windings disposed therein to form a plurality of first pole faces;

a second electromagnet arrangement, said second arrangement having electrical current conductive coil windings disposed therein to form a plurality of second pole faces, said second plurality of pole faces being in a symmetrical mirrored facing relationship to said first plurality of pole faces, such that a gap is defined intermediate said first arrangement and said second arrangement, wherein a current induced in said windings in said first arrangement and said second arrangement will develop magnetic flux across said gap between each of said first pole faces and said second pole faces;

a conductor plate disposed intermediate said first pole faces and said second pole faces, said conductor plate having an electrically conductive ferromagnetic structural portion, a plurality of spaced apart electrically conductive ferromagnetic regions and a plurality of electrically conductive nonferromagnetic conductor bars disposed interstitially said ferromagnetic regions wherein electrical conductivity is continous between said conductor bars and said regions such that magnetic flux when present in said gap permeates through said plate through said regions to develop radially directed electrical currents through said conductor bars and said regions.

8. An induction machine in accordance with claim 10 wherein said conductive bars are comprised of aluminum.

9. An induction machine in accordance with claim 10 wherein said conductive bars are comprised of copper.

10. An induction machine as set forth in claim 7 wherein said conductor plate further includes:

regions of electrically conductive non-ferromagnetic material disposed in the face of said conductor plate to connect the outward ends of each of said conductor bars to each other to define a continous electrical closed loop path within said bars and said regions of non-ferromagnetic material.

* * * * *